US008834586B2

(12) United States Patent
Giroudiere et al.

(10) Patent No.: US 8,834,586 B2
(45) Date of Patent: Sep. 16, 2014

(54) COMPACT EXCHANGER-REACTOR USING A PLURALITY OF POROUS BURNERS

(75) Inventors: Fabrice Giroudiere, Orlienas (FR); Beatrice Fischer, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 1330 days.

(21) Appl. No.: 12/593,510

(22) PCT Filed: Mar. 5, 2008

(86) PCT No.: PCT/FR2008/000293
§ 371 (c)(1),
(2), (4) Date: Apr. 2, 2010

(87) PCT Pub. No.: WO2008/132313
PCT Pub. Date: Nov. 6, 2008

(65) Prior Publication Data
US 2010/0189638 A1    Jul. 29, 2010

(30) Foreign Application Priority Data

Mar. 30, 2007  (FR) ..................................... 07 02410

(51) Int. Cl.
| B01J 7/00 | (2006.01) |
| F23D 14/00 | (2006.01) |
| F28F 1/00 | (2006.01) |
| B01J 8/06 | (2006.01) |
| F23D 14/20 | (2006.01) |
| F23C 99/00 | (2006.01) |

(52) U.S. Cl.
CPC ....... *B01J 8/067* (2013.01); *F23C 2900/03002* (2013.01); *F23D 2203/1012* (2013.01); *F23C 2900/9901* (2013.01); *F23D 14/20* (2013.01); *B01J 2208/00504* (2013.01); *B01J 8/062* (2013.01); *F23D 2203/1055* (2013.01); *F23C 99/006* (2013.01)
USPC ............. 48/197 R; 48/61; 422/201; 422/619; 422/625

(58) Field of Classification Search
USPC ................... 422/619, 625, 201; 48/197 R, 61
See application file for complete search history.

(56) References Cited

U.S. PATENT DOCUMENTS

| 3,119,671 | A |   | 1/1964 | Russell et al. |
| 3,449,671 | A | * | 6/1969 | Long ......................... 324/121 R |
| 4,900,245 | A | * | 2/1990 | Ahmady ....................... 431/328 |
| 5,254,765 | A |   | 10/1993 | Martin et al. |

(Continued)

FOREIGN PATENT DOCUMENTS

| DE | 199 05 327 A1 |   | 3/2000 |
| DE | 19905327 A1 | * | 3/2000 |

(Continued)

OTHER PUBLICATIONS

"International Search Report", International Application No. PCT/FR2008/000293, Date of Publication Oct. 5, 2008, date of mailing Oct. 28, 2008, searching authority EPO, pp. 2.

*Primary Examiner* — Stanley Silverman
*Assistant Examiner* — Syed Iqbal
(74) *Attorney, Agent, or Firm* — Millen, White, Zelano & Branigan, P.C.

(57) ABSTRACT

The present invention describes a novel exchanger-reactor intended to implement highly endothermic reactions such as natural gas or naphtha steam reforming, using in situ porous burners.

14 Claims, 3 Drawing Sheets

(56) References Cited

U.S. PATENT DOCUMENTS

| | | | |
|---|---|---|---|
| 6,296,814 B1 * | 10/2001 | Bonk et al. | 48/61 |
| 6,497,856 B1 * | 12/2002 | Lomax et al. | 423/651 |
| 2003/0101651 A1 | 6/2003 | Weedon | |
| 2004/0194921 A1 | 10/2004 | DiMartino, Sr. | |

FOREIGN PATENT DOCUMENTS

| | | | |
|---|---|---|---|
| DE | 199 21 420 A1 | | 11/2000 |
| DE | 19921420 A1 | * | 11/2000 |
| EP | 0 430 804 A | | 6/1991 |
| EP | 430804 A | * | 6/1991 |
| EP | 0 895 806 A | | 2/1999 |
| EP | 895806 A2 | * | 2/1999 |
| EP | 1 464 910 A | | 10/2004 |
| EP | 1464910 A2 | * | 10/2004 |
| GB | 2 359 764 A | | 9/2001 |
| GB | 2359764 A | * | 9/2001 |

* cited by examiner

US 8,834,586 B2

COMPACT EXCHANGER-REACTOR USING A PLURALITY OF POROUS BURNERS

FIELD OF THE INVENTION

The invention relates to a novel exchanger-reactor intended to implement highly endothermic chemical reactions, such as naphtha or natural gas steam reforming reactions.

The term "exchanger-reactor" means a chemical reactor in which the reaction or reactions occur inside a bundle of tubes enclosed in a shell, the energy necessary for the reactions being supplied by a hot fluid circulating inside said shell and outside the tubes, and giving up its heat to the reaction tubes essentially by convection.

In the exchanger-reactor of the present invention, energy is supplied by combustion of a fuel which may contain hydrogen, said combustion taking place inside the exchanger-reactor proper and generating combustion fumes part of which gives up its energy principally by radiation, and another part of which gives up its energy principally by convection. The term "principally" means a radiation contribution of at least 70% in the zone termed the radiation zone and a convection contribution of at least 70% in the zone termed the convection zone.

The novel aspect of the exchanger-reactor of the invention, then, lies in the existence of a zone for heating the reaction tubes in which heat transfer occurs principally by radiation.

The burner provided in the exchanger-reactor of the invention is a no pre-mix ("nozzle mixing") burner with a cylindrical geometry having a porous element separating the fuel side from the oxidizer side, combustion occurring either inside said porous element or close to its outer surface to generate a flat flame in this latter case. In the remainder of the text, the term "porous burners" will be used to designate specific burners used in the exchanger-reactor of the invention. A complete description of these porous burners can be found in French patent application 06/10999.

The fuel used in the context of the present invention may be a gaseous hydrocarbon-based fuel such as natural gas. In some cases it may contain hydrogen and in some cases it may be essentially constituted by hydrogen.

The oxidizer used may be any oxygen-containing gas, in particular air, but also air enriched or depleted in oxygen. In one particular case the oxidizer may even be pure oxygen.

In general, exchanger-reactors may be defined as a category of reactors in which the energy necessary for the chemical reactions is supplied by a hot fluid, with heat exchange between said hot fluid and the feed to be treated circulating inside a plurality of tubes occurring primarily by convection. Usually, exchanger-reactors have a small capacity (of the order of 1000 to 5000 $Nm^3/h$ of $H_2$ production) and are used for small scale local production. An example of a small capacity exchanger-reactor which may be cited is the reactor described in patent application WO-A-2001056690 or in U.S. Pat. No. 4,919,844.

The reactor of the present invention is an exchanger-reactor which can produce small amounts of hydrogen, like those of the prior art, but also can reach large capacities, of the order of 100000 $Nm^3/h$ of $H_2$ production, similar to those routinely achieved in steam reforming furnaces.

Because the production of energy in the exchanger-reactor of the invention is carried out by combustion inside the exchanger-reactor proper, in the shape of a flat flame, it may also be compared with a furnace. However, it is distinguished from a steam reforming furnace by its capacity to operate under pressure, while the pressure inside steam reforming furnaces is generally limited to 2 bars absolute.

By dint of certain arrangements regarding the distribution of the reactant fluids, the present reactor accommodate shell side pressures of the order of ten bars (1 bar=$10^5$ pascals).

The exchanger-reactor of the invention is thus an exchanger-reactor which generates heat by in situ combustion, using a specific burner allowing a flat flame to be generated and which can accommodate hydrogen production capacities of 500 to 100000 $Nm^3/h$.

Examination of the Prior Art

The prior art in the field of exchanger-reactors with "in situ" combustion is represented by:

International patent application WO-A1-2007 000244, which describes a small capacity exchanger-reactor intended for the production of hydrogen in quantities of the order of 1000 $Nm^3$/hour and comprising a first zone for generating heat using a burner, followed by a second zone for exchange by convection between the combustion fumes generated in the first zone and tubes inside which the reactive mixture circulates. In that reactor, the zone for generating heat by means of a burner contains no reaction tubes and the burner is a conventional burner.

U.S. Pat. No. 6,136,279 describes a steam reforming furnace comprising a cylindrical envelope enclosing a plurality of tubes to be heated and a burner itself contained in an inner envelope of the cylindrical envelope and defining a combustion chamber. The inner envelope containing the burner is separated from the tubes to be heated in a manner such that the tubes do not see the flame and are heated solely by convection of the hot fumes.

In the reactor of the present invention, because a specific burner comprising a porous element, is used it is possible to install said burners directly between the tubes to be heated, which latter are thus heated both by convection of the hot fumes but also, over at least a portion of their length, by direct radiation.

BRIEF DESCRIPTION OF THE INVENTION

Figure 1:
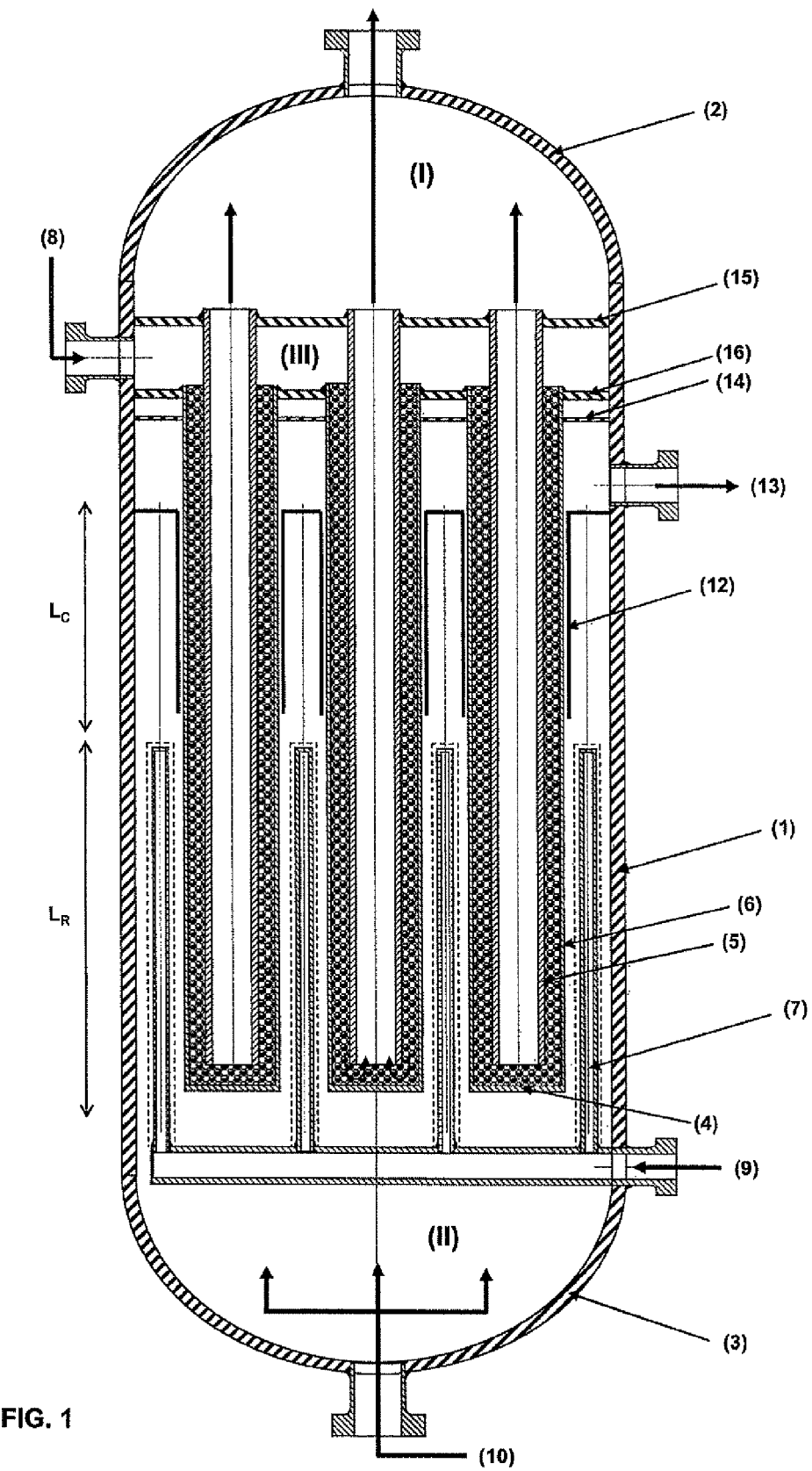
FIG. 1 shows a sectional profile of an exchanger-reactor of the invention.

The exchanger-reactor of the present invention is intended to carry out highly endothermic reactions at temperatures which may be as high as 950° C. Typically, it may be used for steam reforming hydrocarbon cuts, in particular naphtha or natural gas, with a view to producing hydrogen.

Given the nature of the burners used in the reactor and the configuration of these burners with respect to the tubes to be heated, it is possible to produce a much finer thermal profile along the length of said tubes than that which could be achieved with prior art technology.

The burners used have a fuel distributor which is designed in the form of a plurality of sections each having a given orifice diameter to allow modulation of the thermal flux along the longitudinal axis of the burner which is identical to the longitudinal axis of the tubes to be heated, and to the longitudinal axis of the exchanger-reactor itself.

Secondly, because of the existence of a porous element in the structure of the burner, the resulting flame is a "flat" flame which burns much more homogeneously than a traditional flame (i.e. developing in a much more controlled 3-dimensional volume). This flat flame considerably reduces the risk of hot spots, which is a particularly important consideration when considering operational safety in this type of reactor employing pressures on the tube side which can reach several tens of bars, and generating effluents containing hydrogen.

Finally, the "flat" form of this flame, i.e. confined in the form of a ring surrounding the burner in the immediate vicinity of the porous element forming part of said burner, will get close to the tubes to be heated and substantially improve compactness compared with prior art technology, in particular that described in International patent application WO-A-2007/000244.

The exchanger-reactor of the invention can thus be defined as an exchanger-reactor for carrying out highly endothermic reactions. It is constituted by a shell which is generally cylindrical (1) in shape closed at its upper portion by a cap (2) which is substantially ellipsoidal in shape and at its lower portion by a bottom (3) of substantially ellipsoidal shape, said shell (1) enclosing a plurality of vertical tubes (4) of length Lt which extend along the cylindrical portion of the shell (1). The reactant fluids circulate inside the tubes (4), said tubes having at least one end communicating with the outside of the exchanger-reactor, and said tubes being heated by a plurality of porous no pre-mix burners (7) of length Lb, extending vertically between the tubes to be heated (4) such that the ratio Lb/Lt is in the range 0.1 to 0.8, preferably in the range 0.2 to 0.7.

The centre-to-centre distance between a given burner and the neighboring tube or tubes is generally in the range 100 mm to 5.00 mm.

The ratio H/D between the height H of the reactor and its diameter D is generally in the range 1 to 10, preferably in the range 2 to 8.

The tubes to be heated (4) are preferably bayonet tubes, the reactants entering into and the effluents exiting from the upper portion (I) of the reactor, the fuel in the porous burners (7) being distributed in the lower portion (II) of the reactor.

The convection heating zone is generally provided with a baffle to obtain a combustion fume circulation rate along the heating tube generally in the range 5 m/s to 60 m/s, preferably in the range 20 m/s to 50 m/s.

The number of tubes to be heated per m² of reactor section is generally in the range 4 to 17, preferably in the range 5 to 13. The term "section" of the treatment means the geometric section of the reactor empty of any internal apparatus.

The tubes usually form a triangular spacing pattern with a centre-to-centre distance which is preferably in the range 2 to 4 times the internal diameter of the tube.

More precisely, when the tubes are of the bayonet type, they usually form a triangular spacing pattern with a centre-to-centre distance which is preferably in the range 2 to 4 times the internal diameter of the outer envelope (6).

The upper portion of the fume circulation zone may in some cases comprise a deflection plate (14) located a distance of at least 5 cm away from the tubular plate (15) it protects.

The fuel used in the porous burners is generally a gaseous fuel of any chemical composition, such as natural gas in particular. In some cases it may contain a portion of the reaction effluent after reacting to transform CO into $CO_2$ and eliminating that $CO_2$ and water. In some cases, it may be constituted by hydrogen in a molar proportion which may be from 5% to 100%, i.e. it may optionally be constituted by pure hydrogen.

The invention also concerns a steam reforming process employing the exchanger-reactor of the invention, and preferably using natural gas as a feed for the production of hydrogen.

DETAILED DESCRIPTION OF THE INVENTION

The description below is made with the help of FIG. 1 which corresponds to a longitudinal section of the reactor of the invention.

The exchanger-reactor is composed of an outer envelope comprising a cylindrical portion (1) which is approximately vertical, with its upper portion completed by a cap (2) which is approximately ellipsoidal in shape, and with its lower portion completed by a bottom (3) of approximately ellipsoidal shape. The combination of portions (1), (2) and (3) is termed the shell.

The shell encloses a plurality of tubes (4) extending along the vertical axis of the reactor, and having a reactant distribution means (8) and an effluent collection means (11) passing through the shell and allowing communication of said reactor with the outside.

FIG. 1 shows bayonet type tubes with an inlet (8) for the reactants and an outlet (11) for the effluents located on the same upper end of the reactor. Clearly, this representation is not limiting in any way and the inlet and outlet for the reactant fluids could be located at the lower end of the radical.

The bayonet type tube is the preferred type of tube for the present invention, but the reactor of the invention may also function with simple tubes having an inlet and outlet located one at the upper end (or lower end) and the other at the lower (or upper) end of said reactor.

The bayonet tubes (4) of the fluid to be treated are constituted by an outer cylindrical envelope (6) inside which is a tube (5) which is open at its upper end opening into the upper portion (I) of the reactor, and open at its lower end opening into the cylindrical envelope (6).

For the sake of clarity in the description below, it will be assumed that fluid to be treated enters via the upper portion (III) of the reactor via a distribution means having at least one opening (8) communicating with the outside of the exchanger-reactor, allowing entry of the fluid to be treated, and having a plurality of openings communicating directly with the annular portion of the tubes (4).

Zone (III) is included between the first tubular plate (15) to which the outer envelopes (6) of tubes (4) are fixed and the second tubular plate (16) to which the inner tubes (5) are fixed.

The annular zone of the tubes (4) is defined by the inner wall of the envelope (6) and the outer wall of the inner tube (5), said annular zone generally being filled with catalyst. The steam reforming catalyst is generally based on nickel and is usually in the form of small cylinders with a diameter in the range 8 mm to 15 mm, and with a height in the range 5 mm to 10 mm. The invention is not in any way concerned with the type of catalyst or a particular shape thereof.

The fluid to be treated circulates as a downflow along said annular zone to its lower end then passes after a 180° turn into the interior of the inner tube (5). The fluid to be treated rises along said inner tube (5) the upper end of which opens into the upper portion (I) of the exchanger-reactor. Along the descending portion of its path inside the annular zone of the tube (4), the fluid to be treated is initially heated over a length Lc principally by convection then secondly it is heated over a length Lr principally by radiation. The zones corresponding to the length Lc and to the length Lr are respectively termed the convective zone and the radiative zone. It is an important aspect of the present invention that the distribution of the convective zone and the radiative zone can be adjusted by altering the length of the porous burners (7) and also the distribution of the outlet orifices for the fuel at the porous burners (7).

The portion Lc corresponding to heating by convection may comprise a baffle or any other equivalent system (12) which can accelerate the combustion fumes in a direction substantially parallel to the length of the tubes (4) to encourage heat exchange by convection.

Preferably, the longitudinal speed of the fumes along the convective zone is in the range 5 m/s to 60 m/s, more preferably in the range 10 m/s to 50 m/s.

Figure 3:
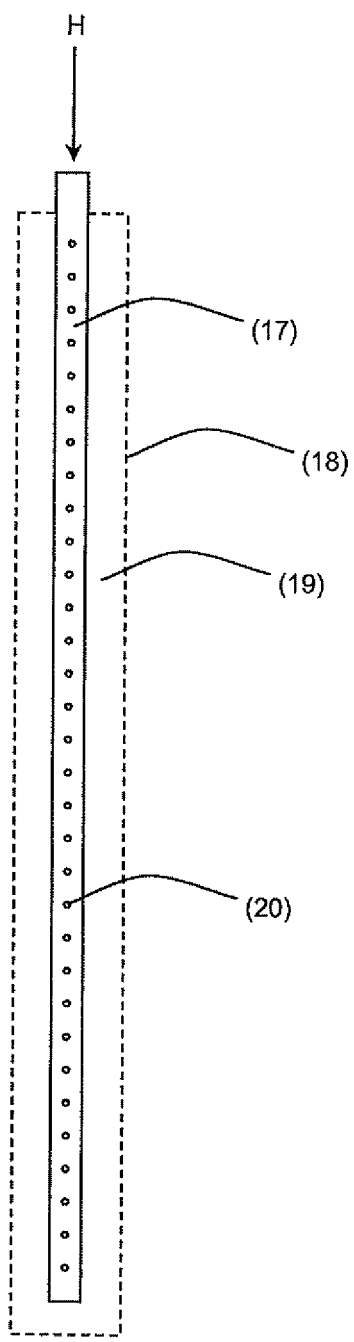
FIG. 3 shows a porous burner used in the exchanger-reactor of the invention.

FIG. 3 is a diagrammatic view of a porous burner used in the exchanger-reactor of the present invention.

The porous burners used in the exchanger-reactor of the invention are no pre-mix burners with a cylindrical geometry, a length Lb and a diameter Db, with a ratio Lb/Db which is generally in the range 10 to 500, preferably in the range 30 to 300. These burners have a central fuel distributor (17) with a non-uniform distribution of orifices (20) and having a porous element (18) with an annular shape surrounding the central distributor (17) at least over its entire length Lb, the thickness of said porous element (18) preferably being in the range 0.5 to 5 cm, and the inner surface of said porous element (18) preferably being located at a distance from the central distributor (17) in the range 0.5 cm to 10 cm. This is precisely the distance corresponding to the zone denoted (19) in FIG. 3.

The porosity of the porous element (18) is generally less than 50%, and preferably less than 30%. This porosity is defined as the void volume with respect to the bulk volume of the porous element. Usually, this porosity is homogeneous throughout the porous element but in some cases it may differ, i.e. have a different value in various zones of said porous element.

The porous burners (7) used in the present invention have a central distributor (17) which may have a single sector with a single orifice diameter or it may be divided into at least two sectors, each sector having orifices (20) of the same diameter, and the diameters of the various sectors differing with respect to each other.

As an example, the central distributor (17) may be divided into at least two sectors, each sector having orifices (20) with a diameter which increases with axial distance along the distributor in the direction of fuel flow.

By way of non-limiting example of the various embodiments of the distributor for the porous burners (7), the central distributor (17) may be divided into at least two sectors, each sector having orifices (20) with a diameter which increases in accordance with an exponential function in the direction of flow of fuel. This disposition can produce an approximately constant thermal flux through the length of the porous burner (7), which would not be the case with a single diameter orifice because of the pressure drop along the distributor which would necessarily result in a lower fuel flow rate for the orifices furthest from the end at which fuel is introduced into said distributor. This aspect is all the more important in the context of the present invention when the porous burners have lengths Lb of 10 m or more; they may be up to 15 meters long.

The porous burners (7) are supplied with fuel (denoted (H) in FIG. 3) via the distribution means (9) which may be of any type known to the skilled person, for example in the form of a rake, to uniformly supply the plurality of porous burners (7). The present invention is not limited to a particular type of fuel distributor.

The burners (7) extend vertically over a length Lb and are disposed so that the distance between a given burner and the closest tube or tubes to be heated is preferably in the range 100 mm to 700 mm and more preferably in the range 150 mm to 500 mm. This distance is defined as the distance separating the axis of the burner from the axis of the tube, termed the "centre-to-centre" distance. The length Lb of the porous burners is related to the length Lt of the tubes to be heated and is generally in the range 0.1 to 0.8 times the length of said tubes, and preferably in the range 0.2 to 0.7 times the length of the tubes. Because of the length of the tubes to be heated, the porous burners will generally be in the range 2 to 15 meters long, preferably in the range 4 to 12 meters long.

Figure 2:
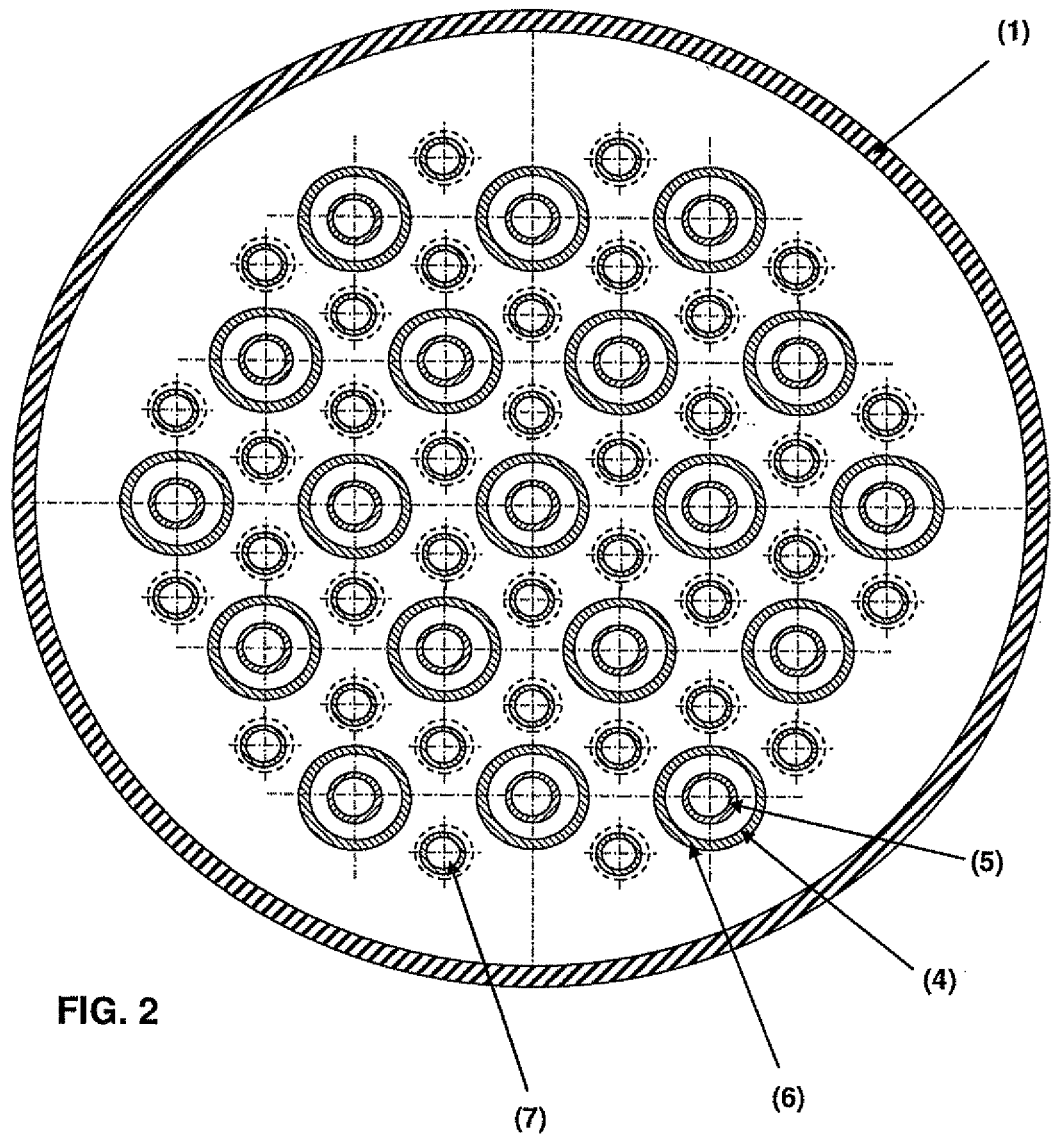
FIG. 2 shows a horizontal section of an exchanger-reactor which allows the relative disposition of the tubes and burners to be visualized.

FIG. 2 shows a typical disposition of the tubes to be heated (4) and the porous burners (7) in the particular case in which the tubes are organized in a triangular spacing pattern with a centre-to-centre distance between the tubes equal to 3 times the internal diameter of the outer envelope (6) of the tubes (4).

The top view of FIG. 2 shows that a given tube is surrounded by an average of 6 burners, the burners forming a hexagonal spacing pattern.

The configuration of FIG. 2 is in no way a limitation on the various distribution configurations which the burners (7) and tubes (4) may assume. In particular, the tubes may in some cases form a square spacing pattern. For compactness reasons, the preferred configuration is that of tubes forming a triangular spacing pattern.

The fuel may be of any type which is available at the site where the exchanger-reactor is installed, which is usually a refinery or petrochemicals complex. As an example, the fuel may be a natural gas or a gas derived from a purge of certain units of the refinery (off-gas).

The fuel may contain hydrogen in a proportion in the range 5% to 100% molar, i.e. it may be constituted by pure hydrogen.

One example of a composition of such a gas is given below, as a molar percentage:

| | |
|---|---|
| $H_2$: | 27.6% |
| $CH_4$: | 35.6% |
| $C_2H_6$: | 19.2% |
| $C_3H_8$: | 9.9% |
| $C_4H_{10}$ and heavier: | 7.7% |

The fuel may also be partly constituted by $H_2$-rich gas production, or effluent from the exchanger-reactor after conversion of CO to $CO_2$, extraction of said $CO_2$ and condensation of water.

A typical example of such a fuel is given below, as a molar percentage:

| | |
|---|---|
| $H_2$: | 92.10% |
| $CH_4$: | 5.35% |
| $CO_2$: | 0.78% |
| CO: | 1.5% |
| $N_2$: | 0.25%. |

The porous burner used in the present invention can process any fuel containing hydrogen, in a proportion in the range 5% to 100% molar.

In some cases, the fuel may be partially constituted by a fraction of the reaction effluent from the exchanger-reactor.

The oxidizer, generally air which may be enriched with oxygen, is admitted via a tube (10) located in the lower portion of the reactor.

Combustion is generally carried out at the surface of the porous element constituting the burner (7). Because of this porous element, the burner is a no pre-mix burner. The flame resulting from combustion is a flame which is localized to the immediate vicinity of the porous element, and for this reason is termed a flat flame.

The combustion fumes released at a temperature which may reach 1000° C. (the precise value depends on the excess of air used) heat the tubes principally by radiation over a fraction of their length (Lr) approximately corresponding to the length of the burner (Lb) then principally by convection over the remainder of the length of the tube (Lc) which extends up to the protective plate (14).

The fumes are not in contact with the tubular plate (15) to avoid any problems with too large a temperature difference between the 2 faces of said tubular plate; the face orientated towards region (III) is at the admission temperature of the reactant fluids, i.e. a temperature which is generally in the range 300° C. to 550° C., and the face orientated towards region (I) is at a temperature close to the outlet temperature of the reaction effluents, i.e. at a temperature which is generally in the range 550° C. to 850° C.

A protective plate (14) which is substantially parallel to the tubular plate (15) is thus installed upstream of said tubular plate (15) to provide said plate (15) with thermal protection for said plate (15).

The fumes are evacuated from the exchanger-reactor via the outlet pipework (13), preferably located between the protective plate (14) and the baffle (12).

EXAMPLES

Example 1

Dimensions of an Exchanger-Reactor in Accordance with the Invention with a Hydrogen Production Capacity of 7000 Nm³/Hour The exchanger-reactor was designed to produce 7000 Nm³/hour of hydrogen by steam reforming natural gas.

The fuel used was a refinery off-gas which had the following molar composition:

| | |
|---|---|
| $H_2$: | 27.6% |
| $CH_4$: | 35.6% |
| $C_2H_6$: | 19.2% |
| $C_3H_8$: | 9.9% |
| $C_4H_{10}$ and heavier: | 7.7% |

The flow rate of the fuel was 150 kilomoles/h:
Total reactor height (with upper and lower caps): 15 m;
Reactor diameter: 2 m;
H/D ratio: 7.5;
Bayonet type tubes were used;
Tube length: 12 m;
External diameter of tubes to be heated: 200 mm;
External diameter of inner tube: 40 mm;
External diameter of porous burners: 100 mm;
Length of porous burners: 5 m;
Centre-to-centre distance of tubes to be heated: 300 mm;
Number of tubes: 19 tubes distributed in triangular spacing pattern;
Number of porous burners: 36;

Example 2

Dimensions of an Exchanger-Reactor in Accordance with the Invention with a Hydrogen Production Capacity of 90000 Nm³/Hour The exchanger-reactor was designed to produce 90000 Nm³/hour of hydrogen by steam reforming natural gas.

The fuel used was part of the effluent from the exchanger-reactor after transformation of CO into $CO_2$ and water capture:

| | |
|---|---|
| $H_2$: | 92.10% |
| $CH_4$: | 5.35% |
| $CO_2$: | 0.78% |
| CO: | 1.5% |
| $N_2$: | 0.25%. |

Total reactor height (with upper and lower caps): 16 m;
Reactor diameter: 7 m;
H/D ratio: 2.3;
Bayonet type tubes were used;
Tube length: 12 m;
External diameter of tubes to be heated: 200 mm;
External diameter of inner tube: 40 mm;
External diameter of porous burners: 100 mm;
Length of porous burners: 5 m;
Centre-to-centre distance of tubes to be heated: 300 mm;
Number of tubes: 235 tubes distributed in triangular spacing pattern;
Number of porous burners: 445.

The invention claimed is:

1. An exchanger-reactor for carrying out highly endothermic reactions, comprising
a generally cylindrical shell (1) closed at its upper portion by a cap (2) which is substantially ellipsoidal in shape and in its lower portion by a bottom (3) of substantially ellipsoidal shape,
said shell (1) enclosing a plurality of vertical tubes (4) each having an internal diameter and a of length Lt which extend along the cylindrical portion of the shell (1) for circulating reactant fluids,
said tubes forming a triangular spacing pattern with a centre-to-centre distance in the range of 2 to 4 times the internal diameter of the tubes, said tubes having at least one end communicating with the outside of the exchanger-reactor, and
said tubes being heated by a plurality of elongated porous no pre-mix burners (7) of length Lb, extending vertically between the tubes to be heated (4) such that the ratio Lb/Lt is in the range 0.1 to 0.8, and a centre-to-centre distance between a given burner and neighboring tube or tubes in a range 100 mm to 500 mm,
wherein said exchanger-reactor has a central distributor (17) of said burners (7) divided into at least two sectors, each sector having vertically spaced orifices (20) with diameters which increase with axial distance along the distributor in the direction of fuel flow, with said vertically spaced orifices providing means for radiant heating axially superposed by means for convective heating, said porous burners having a vertical length of 10 m to 15 m.

2. An exchanger-reactor according to claim 1, in which the ratio H/D between the height H of the reactor and its diameter D is in the range 1 to 10.

3. An exchanger-reactor according to claim 1, in which the tubes to be heated (4) are bayonet tubes, for allowing the reactants to enter into and the effluents to exit from the upper portion (I) of the reactor, allowing the fuel in the porous burners (7) to be distributed in the lower portion (II) of the reactor.

4. An exchanger-reactor according to claim 1, having a convection heating means provided with a baffle for permitting a combustion fume to circulate in a zone along the heating tube at a rate in the range 5 m/s to 60 m/s.

5. An exchanger-reactor according to claim 1, in which the number of tubes to be heated per $m^2$ of effective reactor section is in the range 4 to 17.

6. An exchanger-reactor according to claim 1, in which an upper portion of the fume circulation zone comprises a deflection plate (14) located at a distance of at least 5 cm with respect to a tubular plate (15) which it protects.

7. An exchanger-reactor according to claim 1, in which the fuel used in the porous burners contains hydrogen in a molar proportion in the range 5% to 100%.

8. An exchanger-reactor according to claim 1, in which the porosity of the porous constituent element of the porous burners (7) is less than 50%.

9. An exchanger-reactor according to claim 1, having a convection heating means provided with a baffle for permitting a combustion fume to circulate in a zone along the heating tube at a rate in the range 5 m/s to 60 m/s.

10. An exchanger-reactor according to claim 9, in which an upper portion of the fume circulation zone comprises a deflection plate (14) located at a distance of at least 5 cm with respect to a tubular plate (15) which it protects.

11. An exchanger-reactor according to claim 1 wherein the ratio H/D between height H of the reactor and its diameter D is in the range of 2 to 8; said means for convection heating being provided with a baffle for permitting a combustion fume to circulate in a zone along the heating tube at a rate in the range of 20 m/s to 50 m/s; said tubes to be heated number per $m^2$ of effective reactor section being in the range of 5-13; and the porosity of the porous constituent element of the porous burners being less than 30%.

12. An exchanger-reactor according to claim 2 wherein the ratio H/D between height H of the reactor and its diameter D is in the range of 2 to 8; said means for convection heating being provided with a baffle for permitting a combustion fume to circulate in a zone along the heating tube at a rate in the range of 20 m/s to 50 m/s; said tubes to be heated number per $m^2$ of effective reactor section being in the range of 5-13; and the porosity of the porous constituent element of the porous burners being less than 30%.

13. A steam reforming process employing an exchanger-reactor according to claim 1, using a naphtha cut as a feed, for the production of hydrogen.

14. A steam reforming process employing an exchanger-reactor according to claim 1, using natural gas as a feed, for the production of hydrogen.

\* \* \* \* \*